United States Patent
Shin

(10) Patent No.: US 8,504,812 B2
(45) Date of Patent: Aug. 6, 2013

(54) MOBILE TERMINAL AND METHOD FOR CONTROLLING ACCESSING OF DEVICE THEREOF

(75) Inventor: Jong-Hwa Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 710 days.

(21) Appl. No.: 12/427,311

(22) Filed: Apr. 21, 2009

(65) Prior Publication Data

US 2010/0191947 A1    Jul. 29, 2010

(30) Foreign Application Priority Data

Jan. 29, 2009   (KR) .................. 10-2009-0007150

(51) Int. Cl.
  *G06F 9/00*    (2006.01)
  *G06F 15/177*  (2006.01)
(52) U.S. Cl.
  USPC .................................. 713/2; 713/1; 713/300
(58) Field of Classification Search
  USPC ................................................ 713/1, 2, 300
  See application file for complete search history.

(56) References Cited

U.S. PATENT DOCUMENTS

| | | | |
|---|---|---|---|
| 5,892,906 A * | 4/1999 | Chou et al. ...................... | 726/19 |
| 6,502,156 B1 * | 12/2002 | Sacker et al. .................. | 710/305 |
| 6,633,981 B1 * | 10/2003 | Davis ............................. | 713/189 |
| 6,904,497 B1 * | 6/2005 | Beckett .......................... | 711/114 |
| 8,125,986 B2 * | 2/2012 | Narayanaswami et al. ... | 370/360 |
| 2003/0120922 A1 * | 6/2003 | Sun et al. ....................... | 713/168 |
| 2003/0145211 A1 * | 7/2003 | Fukawa ......................... | 713/182 |
| 2006/0004928 A1 * | 1/2006 | Hess et al. ....................... | 710/8 |
| 2006/0136736 A1 * | 6/2006 | Yang ............................... | 713/183 |
| 2007/0136593 A1 * | 6/2007 | Plavcan et al. ................ | 713/172 |
| 2007/0208928 A1 * | 9/2007 | Rios et al. ......................... | 713/1 |
| 2008/0052526 A1 * | 2/2008 | Dailey et al. .................. | 713/186 |
| 2008/0104348 A1 * | 5/2008 | Kabzinski et al. ............. | 711/164 |
| 2008/0222433 A1 * | 9/2008 | Kim ................................. | 713/300 |
| 2009/0119526 A1 * | 5/2009 | Liu et al. ........................ | 713/323 |
| 2010/0083366 A1 * | 4/2010 | Challener et al. ............... | 726/17 |
| 2010/0275032 A1 * | 10/2010 | Bhangi .......................... | 713/182 |

* cited by examiner

*Primary Examiner* — Vincent Tran
(74) *Attorney, Agent, or Firm* — KED & Associates, LLP

(57) ABSTRACT

A mobile terminal and its device accessing control method are disclosed. When power is applied to the terminal, the terminal executes BIOS information. When certain identification information (ID) is received, whether or not the received identification information is registered one. If the inputted identification information is a registered one, a device and/or application is initialized or the use of the device and/or application is prevented and an operating system is booted according to corresponding device setting information.

20 Claims, 10 Drawing Sheets

USER REGISTRATION

ID : NOSOUND

ENTER PASSWORD : *******

CONFIRM PASSWORD : *******

DEVICE SETTING :

| DEVICE | ENABLE | DISABLE | TIME |
|---|---|---|---|
| LAN | ■ | ☐ | __:__:__ |
| SOUND | ☐ | ■ | __:__:__ |
| DVD/CD | ■ | ☐ | __:__:__ |
| CAM | ■ | ☐ | __:__:__ |

| DEVICE | ENABLE | DISABLE | TIME |
|---|---|---|---|
| LAN | ■ | ☐ | __:__:__ |
| SOUND | ☐ | ■ | __:__:__ |
| DVD/CD | ■ | ☐ | __:__:__ |
| CAM | ■ | ☐ | __:__:__ |

USER REGISTRATION
ID : NOSOUND
ENTER PASSWORD : *******
CONFIRM PASSWORD : *******
DEVICE SETTING :

FIG. 4

| DEVICE | STATUS | TIME |
|---|---|---|
| LAN | ENABLE | 01:00:00 |
| WLAN | ENABLE | __:__:__ |
| SOUND | DISABLE | __:__:__ |
| WEBCAM | DISABLE | __:__:__ |
| USB | ENABLE | __:__:__ |
| BLUETOOTH | DISABLE | __:__:__ |

ID: NOSOUND

| *DEVICE SETTING | | |
|---|---|---|
| DEVICE | STATE | USAGE TIME |
| LAN | ENABLE | 01:00:00 |
| WLAN | ENABLE | __:__:__ |
| SOUND | DISABLE | __:__:__ |
| WEBCAM | DISABLE | __:__:__ |
| DVD/CD | ENABLE | __:__:__ |

OK   CONCEL

FIG. 10

```
USAGE ENVIRONMENT SELECTION
    1. HOME
    2. OUTDOOR
    3. OFFICE
    4. LIBRARY
    5. USER DEFINITION
    SELECT NUMBER: _____
```

MOBILE TERMINAL AND METHOD FOR CONTROLLING ACCESSING OF DEVICE THEREOF

CROSS REFERENCE TO RELATED APPLICATIONS

The present application claims priority to Korean Application No. 10-2009-0007150 filed in Korea on Jan. 29, 2009, the entire contents of which is hereby incorporated by reference in its entirety.

BACKGROUND OF THE INVENTION

1. Field of the Invention

The present invention relates to a mobile terminal for controlling accessing a device and an application of each identifier in a basic input output system (BIOS), and its device accessing control method.

2. Description of the Related Art

A mobile terminal such as a personal computer, a notebook computer, a mobile phone, and the like, may be configured to perform diverse functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

In general, the terminals may be divided into a mobile terminal and stationary terminal according to whether or not terminals are movable. In addition, mobile terminals may be divided into a handheld terminal and a vehicle mount terminal according to whether or not users can directly carry it around.

Efforts are ongoing to support and increase the functionality of mobile terminals. Such efforts include software and hardware improvements, as well as changes and improvements in the structural components which form the mobile terminal.

In the terminal, in order to block using of a device, after booting an operating system is completed, the device is changed to a disable state by a user.

SUMMARY OF THE INVENTION

Accordingly, one object of the present invention is to address the above-noted and other problems.

Another object of the present invention is to provide a mobile terminal for setting accessing a device and application of each user in a basic input output system (BIOS), and its device accessing control method Still another object of the present invention is to provide a mobile terminal for setting accessing a device and application of each usage environment in a BIOS, and its device accessing control method.

Yet another object of the present invention is to provide a mobile terminal for cutting off power supply to a device according to BIOS information of each identifier, and its device accessing control method.

To achieve these and other advantages and in accordance with the purpose of the present invention, as embodied and broadly described herein, the present invention provides in one aspect a mobile terminal including: a memory storing basic input output system (BIOS) information; and a controller that executes the BIOS information when power is applied to the terminal, and initializes a device and/or application or block the use of the same with reference to BIOS information corresponding to certain identification information received in an initial execution screen image of the executed BIOS information.

To achieve these and other advantages and in accordance with the purpose of the present invention, as embodied and broadly described herein, the present invention provides in another aspect a method for controlling accessing a device of a mobile terminal, including: receiving certain identification information after power is applied to the terminal; checking whether the inputted identification information is previously registered identification information; and if the inputted identification information is a previously registered one, initializing a device and/or application or preventing the use of the same according to corresponding device setting BIOS information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 4 illustrates device setting information stored in the mobile terminal according to an embodiment of the present invention;

FIG. 10 illustrates a usage environment select screen image of the mobile terminal according to an embodiment of the present invention.

DETAILED DESCRIPTION OF THE INVENTION

Figure 1:
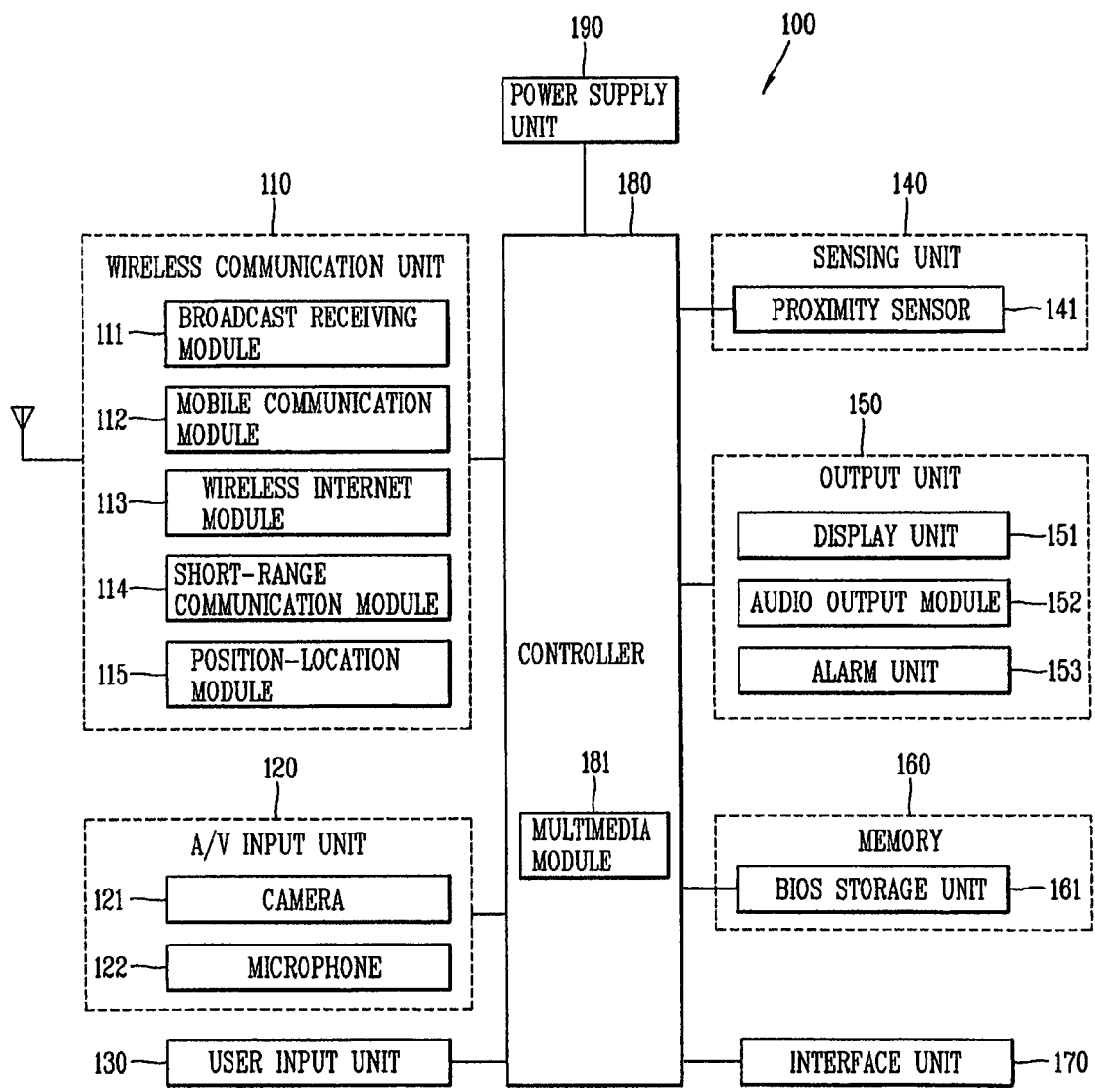
FIG. 1 is a schematic block diagram of a mobile terminal implementing an embodiment of the present invention.

The mobile terminal according to exemplary embodiments of the present invention will now be described with reference to the accompanying drawings.

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

In the present invention, the mobile terminal limits a device access at a basic input output system (BIOS) level. When the mobile terminal is booted, power of a device not in use is cut off based on BIOS information, of if a usage time of a particular device exceeds a pre-set usage time after booting is completed, power supply to the corresponding device is cut off to limit using of the device. Besides, the mobile terminal may initialize an application and/or limit an operation according to the BIOS information.

The BIOS is an operating system program having the most basic processing function of controlling and manipulation communication between the terminal and peripheral devices, which is stored in a flash memory, a read only memory (ROM), and the like. The BIOS, software that relays between hardware and software to manage input/output therebetween, controls every flow of the terminal from a point when the terminal starts to a point when power of the terminal is turned off. Namely, the BIOS serves as an interface handling connection and translation functions between the hardware and software. The BIOS includes a start-up routine, a service routine, a hardware interrupt processing routine, and the like.

Here, the start-up routine is automatically executed when the terminal is turned on to check a state of the terminal (power-on self test: POST), initialize a system, and checks whether a peripheral device is connected during the initialization operation.

The service processing routine processes a user program or a work requested by a DOS. For example, the service processing routine processes deleting screen content, changing a screen from a text mode to a graphic mode, reading disk data or outputting it to a printer.

The hardware interrupt processing part processes an independent request of hardware. It separately operates from the service processing part but maintains a cooperation relation with the service processing part in terms of function.

In the present invention, the mobile terminal may limit a device and/or application access of each user or each usage environment. Here, identification information (account information) such as identification numbers (IDs) and passwords for discriminating users or usage environments are registered in advance. When the identification information is registered, the mobile terminal sets accessing of device and/or application by users or by usage environments according to an external input. In other words, the mobile terminal according to the present invention assigns an ID to each BIOS to limit the use of an unnecessary device and/or application.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location in real time.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may be operated as a signal for recognizing that the mobile terminal is accurately mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit (not shown) and an internal display unit (not shown). The touch screen may be configured to detect even a touch input pressure as well as a touch input position and a touch input area.

A proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like.

The operational principle of the RF oscillation type proximity sensor, among the implementable proximity sensors, will be described as an example. When an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, even if any material other than metallic one is positioned between the RF oscillation proximity sensor and the object, a proximity switch can detect the object intended to be detected without an interference by the object.

Without the proximity sensor 141, if the touch screen is an electrostatic type, the approach of a pointer (stylus) can be detected based on a change in a field according to the approach of the pointer.

Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been outputted or which are to be outputted.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The memory 160 includes a BIOS storage unit 161 storing BIOS information. The BIOS storage unit 161 may be implemented in at least one of a flash memory, a ROM, an EPROM, PROM, and the like.

In addition, the BIOS storage unit 161 has identification information discriminating users and usage environments (usage areas, usage places) and device setting information of each identification information stored therein.

The BIOS storage unit 161 will now be described in more detail with reference to FIG. 2. The BIOS storage unit 161 includes a device permission 161A storing setting information with respect to device accessing. The device permission 161A stores device setting information set for each user or each usage environment. The device setting information includes whether or not a device is to be used, a usage time, and the like. The controller 180 controls the power supply unit 190 according to whether or not the device is in use, to provide power to the corresponding device or cuts it off. For example, if the device is set as "enable", the controller 180 controls the power supply unit 190 to provide power to the corresponding device. Here, the device permission 161A may be accessed from a BIOS or an operating system.

The BIOS storage unit 161 stores information such as an ID, a password an account type, and the like, of a registered user. Here, as the password, text obtained by combining English, numbers, symbols, and the like, or fingerprint information may be used. When fingerprint information is used, the mobile terminal 100 scans a fingerprint of the user by using the sensing unit 140, and checks whether the scanned fingerprint information and fingerprint information previously stored in the memory 160. If the scanned fingerprint information and the previously stored fingerprint information are identical, the mobile terminal 100 approves the user. In this case, the sensing unit 140 includes a fingerprint sensor (not shown) for fingerprint recognition.

The account type may be set as one of a manager and the user. The manager may add a new user or assign a device setting information changing authority of each user and may change device setting information of each user. If the account type is the user, the user can correct his device setting information only when he is given authority for changing the device setting information by a manager.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

When power is applied to the mobile terminal 100, the controller 180 detects it via the sensing unit 140 and executes the BIOS information stored in the BIOS storage unit 161.

As the BIOS information is executed, the controller 180 displays a log-in screen image on a display screen. The controller 180 recognizes data inputted via the user input unit 130 on the log-in screen image as a user account, and checks whether the recognized user account is a previously registered one. If the user account is a previously registered account, the controller 180 performs a device and/or application initialization with reference to the device setting information corresponding to the account.

If the user account is not a previously registered one, the controller 180 outputs a warning message or a message inquiring whether the user wants to perform user registration (new account registration) on the display screen. If a user input in response to the query message is received, the controller 180 enters a user registration mode or performs device initialization in a guest mode according to the user input. Here, when the user enters the guest mode, the controller performs device and/or application initialization based on device setting information set as default.

The power supply unit 190 receives external power (via a power cable connection) or internal power (via a battery of the mobile terminal) and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

In an embodiment of the present invention, in order to control accessing a device and/or application of each identifier, a user registration procedure is first performed. Here, the user registration procedure is a process of setting identification information for discriminating a user and a usage environment and performing device setting (setting for an access to device and application) of each identification information. The user registration may be performed by a manager or through an authentication procedure of the manager after the user requests registration.

Figures 2, 3:
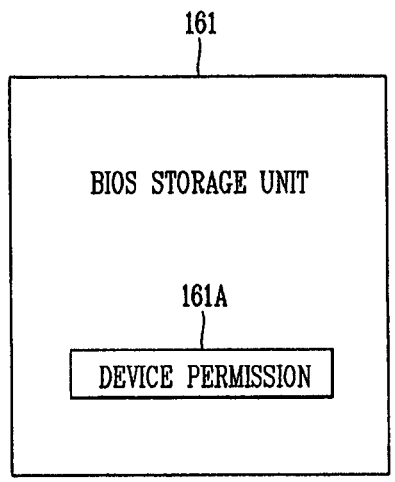
FIG. 2 illustrates the structure of a basic input output system (BIOS) storage unit of the mobile terminal according to an embodiment of the present invention.
FIG. 3 illustrates a user registration screen image of the mobile terminal according to an embodiment of the present invention.

FIG. 3 illustrates a user registration screen image of the mobile terminal according to an embodiment of the present invention.

First, when power is applied to the mobile terminal 100, the controller 180 executes BIOS information stored in the BIOS storage unit 161. After the BIOS information is executed, when a BIOS setup entering command is inputted from the exterior, the controller 180 enters a BIOS setup initial screen. For example, when power is supplied to the mobile terminal 100, the controller 180 leaps over to a start position of the BIOS information stored in the BIOS storage unit 161 to execute the BIOS information. When the BIOS information is executed, the mobile terminal 100 displays the BIOS information on the display screen. At this time, when a certain key (e.g., 'Del') is inputted, the controller 180 enters the BIOS setup initial screen.

After entering the BIOS setup initial screen, a 'device setting' menu is selected from the BIOS setup menu, and when a user registration is selected from among submenus of the selected menu, the mobile terminal 100 displays a user registration screen image as shown in FIG. 3 on the display screen. The user may input information such as an ID, a password, device setting, and the like, on the user registration screen image via the user input unit 130. The device setting information includes information as to whether each device is enabled/disabled, a device usage time, and the like. At this time, the password may be set by the manager or by the user when the user first logs in after user registration. The password may not be used.

As shown in FIG. 3, when a device access cutoff setting/releasing and a usage time are set by identifiers, the set values are stored in a table form in the BIOS storage unit 161 as shown in FIG. 4. Namely, BIOSs set by identifiers are stored in the BIOS storage unit 161.

Figure 5:
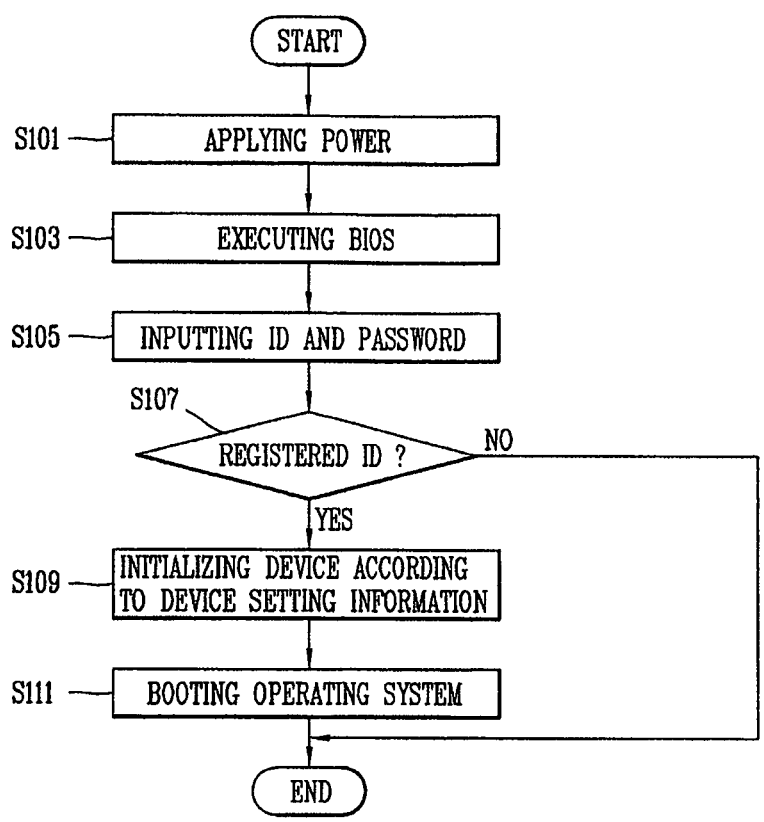
FIG. 5 is a flow chart illustrating a device accessing control method of the mobile terminal according to one embodiment of the present invention.

FIG. 5 is a flow chart illustrating a device accessing control method of the mobile terminal according to one embodiment of the present invention.

With reference to FIG. 5, when power is applied to the mobile terminal 100 (S101), the mobile terminal 100 executes the BIOS information stored in the BIOS storage unit 161 (S103). When the BIOS is executed, the mobile terminal 100 displays a user authentication screen image on the display unit 151.

The mobile terminal 100 receives an ID and a password on the user authentication screen image (S105). Here, the ID is an identifier given to discriminate a user or a usage environment.

The mobile terminal 100 checks whether the inputted ID is a registered one (S107). Namely, the mobile terminal 100 checks whether the inputted ID exists in account information stored in the BIOS storage unit 161.

If the inputted ID is a registered ID, the controller 180 of the mobile terminal 100 initializes a device and/or application according to device setting information corresponding to the inputted ID (S109). In this case, the controller 180 may determine whether to cut off power supply to a device with reference to the device setting information, and set a usage time of the corresponding device. When the initialization of the device and/or application is completed, the controller boots an operating system (S111). After the operating system is completely booted, when the device with the set usage time is driven, the controller 180 operates a counter. The controller 180 checks a usage time of the device, and if the checked usage time exceeds the pre-set usage time, the controller 180 cuts off power supply to the corresponding device. For example, if an Internet usage time is limited, the controller 180 executes a browser such as 'Internet explorer' and operates the counter to check a usage time of the wireless Internet module 113. When the usage time of the wireless Internet module 113 exceeds the pre-set usage time, the controller 180 controls the power supply unit 190 to cut off power supply to the wireless Internet module 113.

If the inputted ID is not a registered one in step S107, the controller 180 outputs a warning message and/or an alarm sound. Alternatively, the controller 180 may change a current image to the user registration image.

Figures 6, 7:
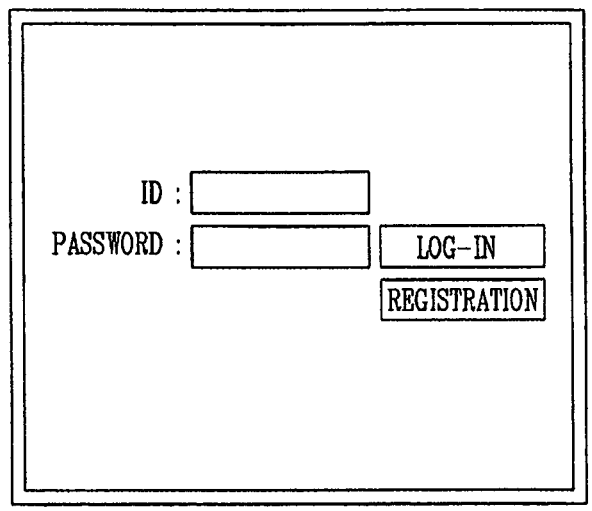
FIG. 6 illustrates one example of a log-in screen image of the mobile terminal according to an embodiment of the present invention.
FIG. 7 illustrates another example of a log-in screen image of the mobile terminal according to an embodiment of the present invention.
Figures 8, 9:
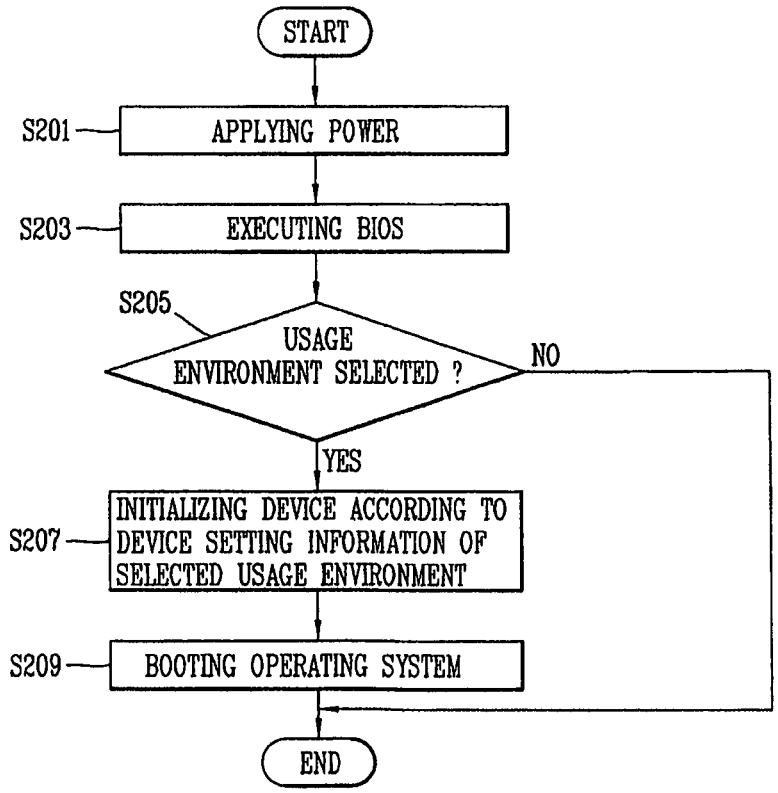
FIG. 8 illustrates a device setting screen image of the mobile terminal according to an embodiment of the present invention.
FIG. 9 is a flow chart illustrating a device accessing control method of the mobile terminal according to another embodiment of the present invention.

FIGS. 6 to 8 illustrate executed screens of each step of a log-in process in the mobile terminal according to an embodiment of the present invention.

When power of the mobile terminal 100 is turned on, the mobile terminal executes the BIOS. At this time, the mobile terminal 100 displays a log-in screen image (user authentication screen image) for receiving an ID and a password as shown in FIG. 6 on the display screen.

The controller 180 inputs data inputted according to manipulation of the user input unit 130 to a corresponding text box on the log-in screen image. Namely, an ID and a password are received from the user input unit 130 and outputted (inserted) to each text box.

After inputting of the ID and the password is completed, if the inputted ID is a registered account, the controller 180 displays device setting information corresponding to the ID for only a certain time period (1 to 3 seconds) on the display screen. Here, the user may check the device setting information displayed on the display screen. After checking the device setting information, if no correction is required, the user selects a 'log-in' icon to perform a booting operation. If there is no any other input during the certain time period from the user, the controller 180 boots the operating system after performing the user authentication procedure for checking the inputted ID and the password.

Meanwhile, if a correction is required, a 'correction' icon is selected to make the mobile terminal 100 enter the device setting mode. When the device setting mode is entered, the controller 180 displays the device setting screen image as shown in FIG. 8 on the display screen. When the device setting is changed on the device setting screen image, the controller 180 updates the device setting information stored in the BIOS storage unit 161 to the changed device setting information.

In this embodiment, the case where booting is performed with the registered account is taken as an example, but if there is no registered account, the user may log in with a guest account. For example, when 'guest' is inputted with an ID and a log-in command is inputted on the log-in screen image, the controller 180 initializes the device based on the device setting information set as default.

When the log-in command is inputted, the controller 180 enters the device setting mode as shown in FIG. 8. After the device setting mode is entered, the user may set device and/or application accessing according to his purpose. Thereafter, the controller 180 initializes the device and/or application according to the set device setting information, or cuts off the operation and boots the operating system.

FIG. 9 is a flow chart illustrating a device accessing control method of the mobile terminal according to another embodiment of the present invention, in which device accessing is controlled by usage environments.

When power is applied to the terminal, the controller 180 executes the BIOS (S201, S203). Namely, when power-on of the terminal is detected via the sensing unit 140, the controller 180 executes the BIOS information stored in the BIOS storage unit 161. When the BIOS information is executed, the controller 180 displays a select screen image for selecting a usage environment on the display screen.

When a usage environment is selected from the select screen image displayed on the display screen, the BIOS initializes the device and/or application according to device setting information of the selected usage environment, or prevents(blocks) its use (S205, S207). The device setting information is a value previously set by usage environments by a manufacturer or the user.

When initialization of the device is completed, the controller 180 boots the operating system (S209). Namely, the controller 180 reads (accesses) and executes the operating system stored in the memory 160.

FIG. 10 illustrates a usage environment select screen image of the mobile terminal according to an embodiment of the present invention.

When power is applied to the mobile terminal according to manipulation of a power key by the user, the terminal executes the BIOS information stored in the BIOS storage unit 161. When the BIOS information is executed, a select screen image for selecting a usage environment (usage area) is displayed on the display screen.

When one of items arranged on the select screen image displayed on the display screen is selected, a device and/or application is initialized with reference to the BIOS information corresponding to a usage environment. At this time, the mobile terminal 100 prevents the use of a device and/or application which are not in use based on the BIOS information. For example, if 'library' is selected as a usage environment, the BIOS cuts off power supply to the audio output module 152 based on the corresponding BIOS setting information. Namely, the terminal presents an audio signal from being outputted to the exterior.

When 'user definition' is selected from the select screen image, the terminal displays the device setting screen image as shown in FIG. 8 on the display screen. When whether a device is to be used, a usage time, and the like, are set on the device setting screen image, the device is initialized according to the set setting information.

FIGS. 11A to 11F illustrate screen images of a user registration process of the mobile terminal according to an embodiment of the present invention, in which device setting is performed after the operating system is booted. Here, the mobile terminal 100 can provide a GUI screen image for performing device setting in a state that the operating system is booted by using an ACPI code.

Figure 11A:
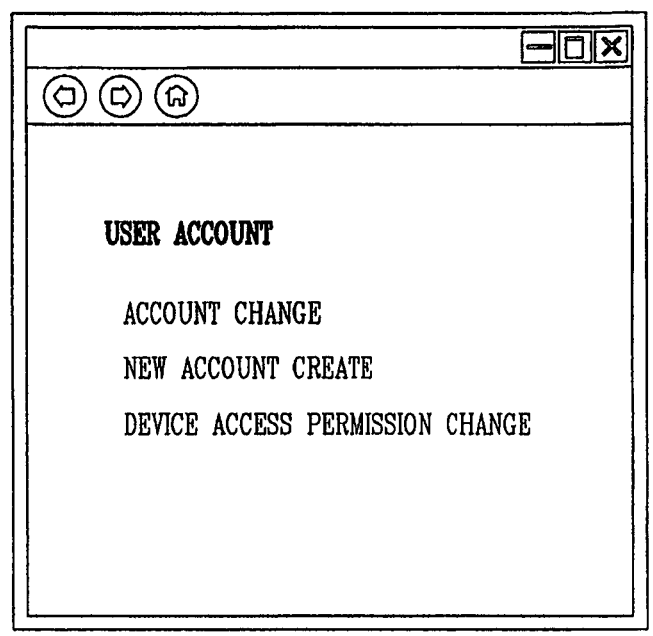
FIGS. 11A to 11F illustrate screen images of a user registration process of the mobile terminal according to an embodiment of the present invention.

In a state that the operating system is completely booted in the mobile terminal 100, if a user is desired to be added or if the device setting is desired to be changed, the user selects a user account management menu through menu manipulation. When the user account management menu is selected, the controller 180 executes a user account management function and displays a user account management screen image as shown in FIG. 11A on the display screen.

Figure 11B:
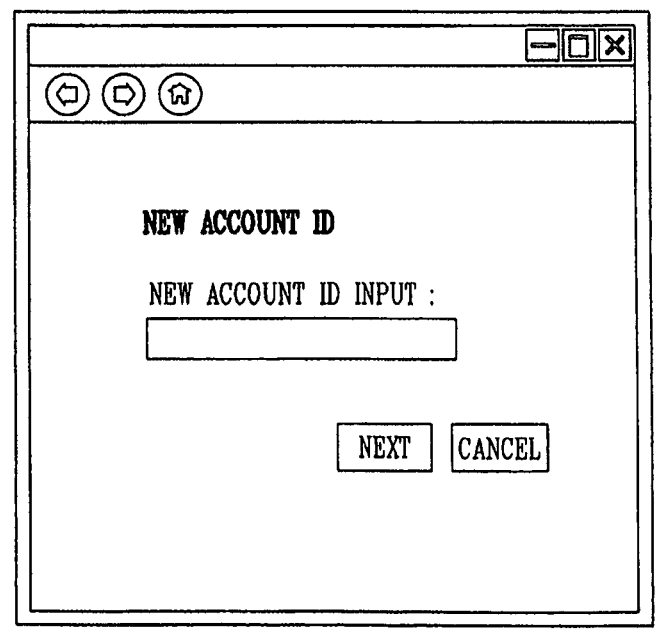
Figure 11C:
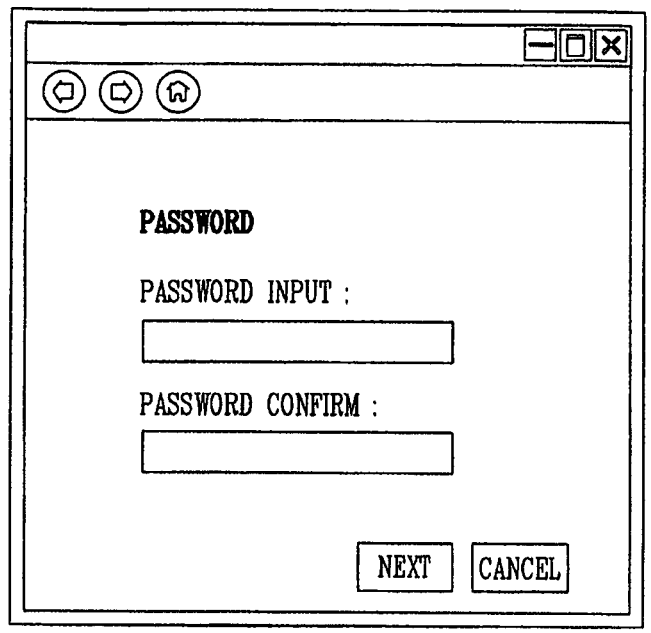

When 'new account creating' is selected from the user account management screen image, the controller 180 displays an input screen image for receiving a new account ID as shown in FIG. 11B on the display screen. When data is inputted via the user input unit 130 on the input screen image, the controller 180 inputs the inputted data to a text box and recognizes the input data as an ID of a new account. At this time, the controller 180 checks whether the inputted ID is a previously registered one. If the inputted ID is a registered ID, the controller 180 outputs a message indicating the corresponding information, and if the inputted ID is not a registered one, the next process is performed. For example, if the manager has authority to set an initial password of the user, the controller 180 displays a password input screen image as shown in FIG. 11C on the display unit 151.

Figure 11D:
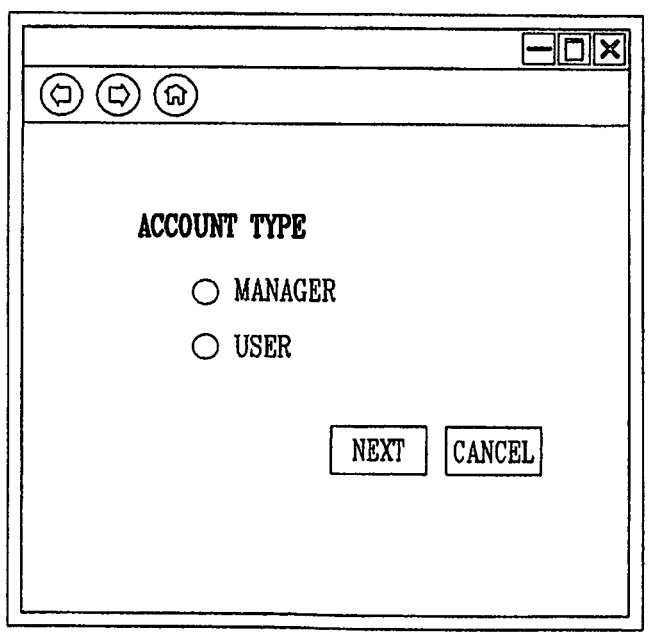

If the manager does not have authority to set the initial password of the user, the process for setting an account type as shown in FIG. 11D is performed. Here, the manager sets a type of the new account as a manager or a user.

Figure 11E:
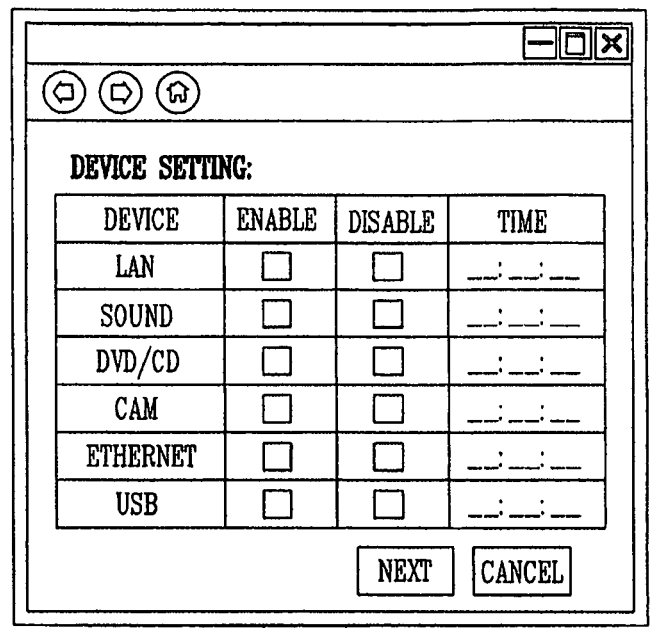
Figure 11F:
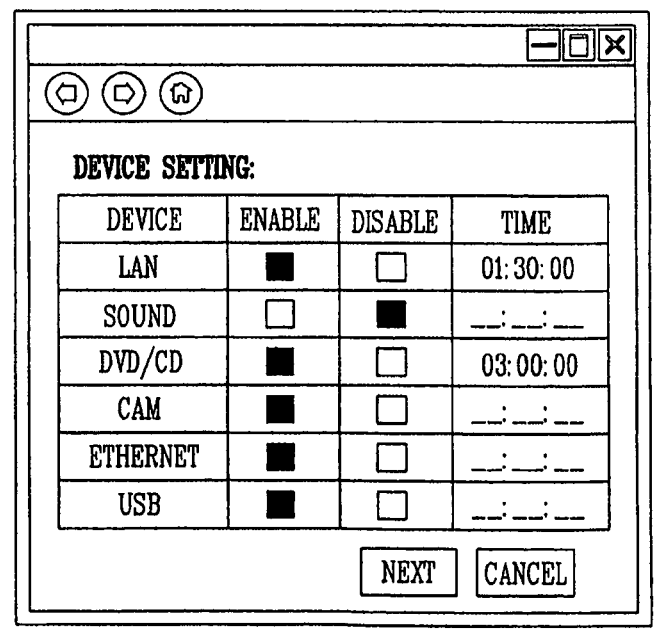

When inputting of information related to the account is completed, the controller 180 displays a device setting screen image for device setting on the display screen as shown in FIG. 11E. The controller 180 sets whether to use a device, a usage time, and the like, as shown in FIG. 11F according to a user input via the user input unit 130 on the displayed device setting screen image.

In this embodiment, the case where a new account is added is taken as an example, but the mobile terminal according to the present invention can correct or delete a registered account.

The mobile terminal according to at least one embodiment of the present invention can control device accessing by the BIOS by setting device accessing by users.

In addition, when account information of the user is inputted while the mobile terminal is booted, power of a device not in use can be cut off according to device setting information of the corresponding account.

Thus, because power supplied to the device not in use is cut off, power can be saved. In addition, because device accessing is controlled by users, the use of the terminal by children can be limited.

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

The mobile terminal according to the embodiments of the present invention is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a memory for storing basic input output system (BIOS) information; and
a controller configured to execute the BIOS information when power is applied to the mobile terminal, to receive certain identification information on an initial screen image of the executed BIOS information, and to initialize at least one of devices or applications of the mobile terminal and to block use of at least one of the devices or the applications of the mobile terminal with reference to device setting information corresponding to the identification information,
wherein the device setting information includes information related to whether to use each of the devices and the applications of the mobile terminal and a usage time of each of the devices and the applications of the mobile terminal.

2. The mobile terminal of claim 1, further comprising:
a power supply unit that supplies power to the device or that cuts off power supply to the device under the control of the controller.

3. The mobile terminal of claim 1, wherein the identification information comprises an ID and/or a password to discriminate a user and a usage environment.

4. The mobile terminal of claim 1, wherein the controller determines whether to cut off power supply to a corresponding device according to whether or not the device is to be used.

5. The mobile terminal of claim 1, wherein the controller sets a usage time of a particular device with reference to the usage time.

6. The mobile terminal of claim 5, wherein when initialization of the device is completed, the controller boots an operating system, and when the corresponding device is driven after booting of the operating system is completed, the controller determines a usage time and when the usage time exceeds a pre-set usage time, the controller cuts off power supply to the corresponding device.

7. The mobile terminal of claim 5, wherein the controller provides an interface environment allowing access to the BIOS information stored in the memory in the operating system.

8. A method for controlling accessing a plurality of devices of a mobile terminal, the method comprising:
receiving inputted identification information on a log-in screen image after power is applied to the mobile terminal;
determining whether the inputted identification information is previously registered identification information; and
when the inputted identification info nation is previously registered identifying information, initializing at least one of the plurality of devices or applications of the mobile terminal and blocking use of at least one of the plurality of devices or the applications of the mobile terminal according to device setting information corresponding to the inputted identification information,
wherein the device setting information includes information related to whether to use each of the devices and the applications of the mobile terminal and a usage time of each of the devices and the applications of the mobile terminal.

9. The method of claim 8, wherein receiving the identification information comprises:
displaying the log-in screen image when power is applied to the mobile terminal; and
receiving the identification information on the log-in screen image,
wherein the identification information comprises an ID and/or a password to discriminate a user and a usage environment.

10. The method of claim 8, wherein initializing at least one of the plurality of devices includes determining whether to cut off power supply to each device according to the corresponding device setting information.

11. The method of claim 8, wherein initializing at least one of the plurality of devices or the applications of the mobile terminal and blocking use of at least one of the plurality of devices or the applications of the mobile terminal includes setting a usage time of each of the plurality of devices or the applications of the mobile terminal with reference to the corresponding device setting information.

12. The method of claim 11, further comprising:
when setting of the usage time of the device and application is completed, booting the operating system;
when the usage time-set device and/or application is operated after the operating system is booted, determining a usage time of the corresponding device and/or application; and
when the determined usage time exceeds a pre-set usage time, cutting off power supply to the corresponding device or limiting the use of the corresponding application.

13. The method of claim 12, wherein the operating system provides an interface environment allowing changing of the device setting information.

14. The method of claim 8, wherein, in determining whether or not the inputted identification information has been registered, a new account adding mode is entered when the inputted identification information is not a previously registered identification information.

15. A mobile terminal comprising:
a memory to store basic input output system (BIOS) information;
a controller to execute an operation based on the BIOS information when power is applied to the mobile terminal; and
a display to display a screen related to the executed operation based on the BIOS information, wherein the mobile terminal to receive account identification information on an initial screen image of the executed BIOS information, and the controller to initialize a first plurality of devices and to block use of at least one of a second plurality of devices based on device setting information that corresponds to the received account identification information,
wherein the device setting information includes information related to whether to use each of the first plurality of devices and a corresponding usage time of at least one of the first plurality of devices.

16. The mobile terminal of claim 15, further comprising:
a power supply unit that supplies power to the devices and that cuts off power to the devices.

17. The mobile terminal of claim 15, wherein the identification information includes an ID and/or a password.

18. The mobile terminal of claim 15, wherein the controller determines whether to cut off a power supply to a corresponding device based on whether the corresponding device is to be used or is not be used.

19. The mobile terminal of claim 15, wherein when initialization of the first plurality of devices is completed, the controller boots an operating system, and when the corresponding device is driven after completing booting of the operating system, the controller determines a usage time and when the usage time is or exceeds a pre-set usage time, the controller cuts off power supply to the corresponding device.

20. The mobile terminal of claim 15, wherein the first plurality of devices that are initialized based on the device setting information includes at least two of a DVD/CD device, a LAN device, a sound device and a CAM device.

* * * * *